2 Sheets—Sheet 1.

P. DILLON & J. CLEARY,

Assignors, by mesne assignments, to W. FARWELL.

Soldering-Machine.

No. 9,205. Reissued May 18, 1880.

Witnesses.

Jos. P. Livermore

L. F. Langer

Inventors

Peter Dillon

John Cleary by Crosby & Gregory Atty

P. DILLON & J. CLEARY,

Assignors, by mesne assignments, to W. FARWELL.

Soldering-Machine.

No. 9,205. Reissued May 18, 1880.

Witnesses.

Jos. P. Livermore

L. F. Connor.

Inventors.

Peter Dillon, aka John Cleary, by Crosby & Gregory Attys

UNITED STATES PATENT OFFICE.

PETER DILLON AND JOHN CLEARY, OF SHERBROOKE, QUEBEC, CANADA, ASSIGNORS, BY MESNE ASSIGNMENTS, TO WILLIAM FARWELL, OF SAME PLACE.

SOLDERING-MACHINE.

SPECIFICATION forming part of Reissued Letters Patent No. 9,205, dated May 18, 1880.

Original No. 186,813, dated January 30, 1877: Reissue No. 7,901, dated October 2, 1877. Application for reissue filed March 24, 1880.

*To all whom it may concern*

Be it known that we, PETER DILLON and JOHN CLEARY, of Sherbrooke, in the Province of Quebec and Dominion of Canada, have invented certain new and useful Improvements in Soldering-Machines; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
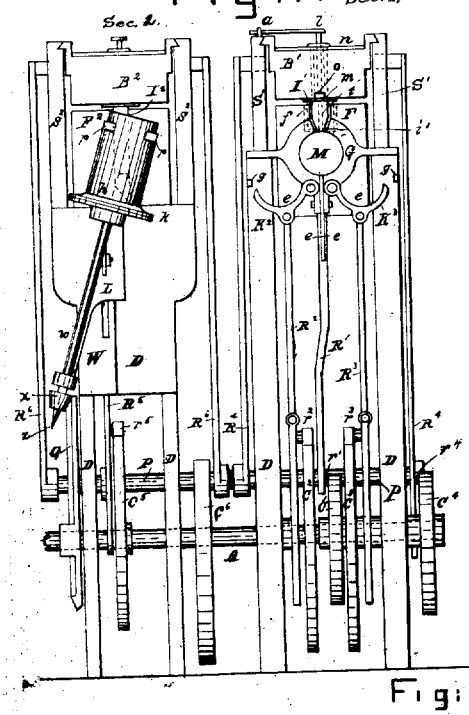
Figure 2:
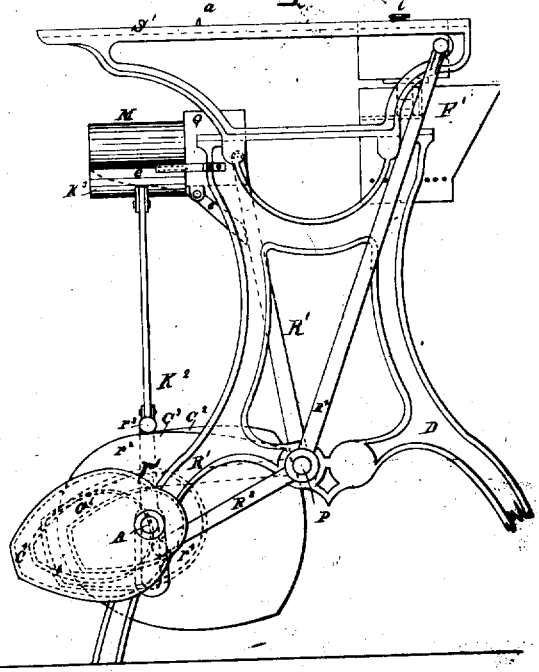
Figure 3:
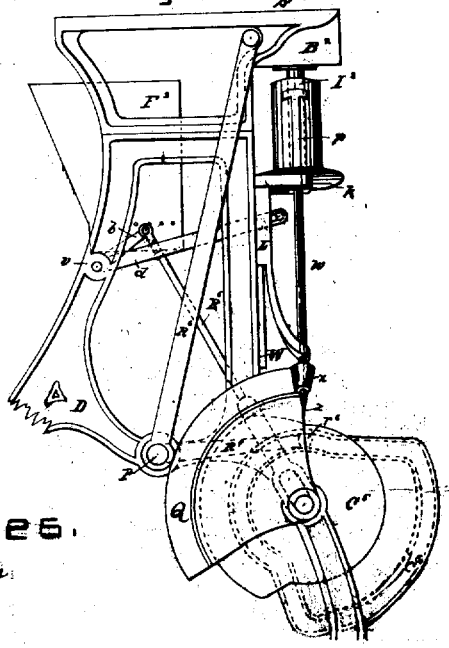
Figure 4:
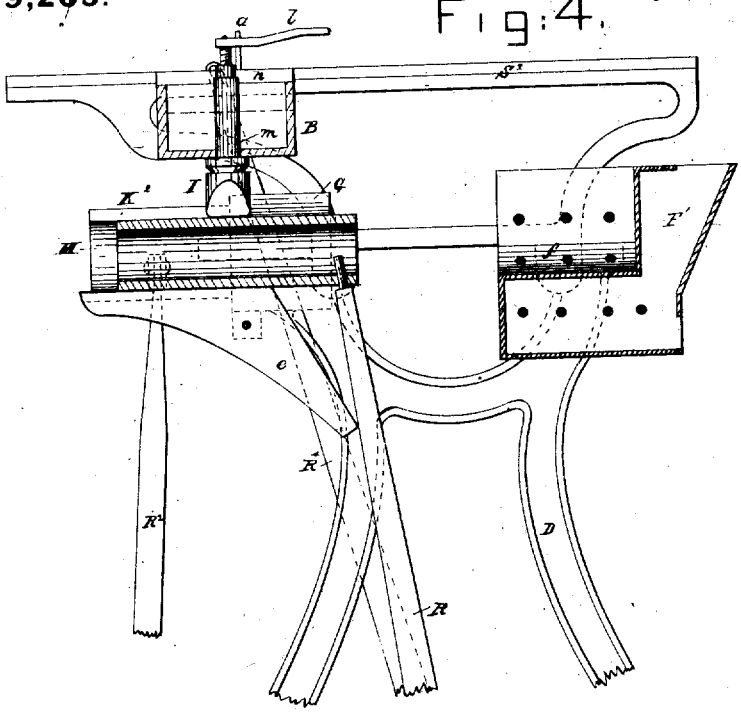
Figure 5:
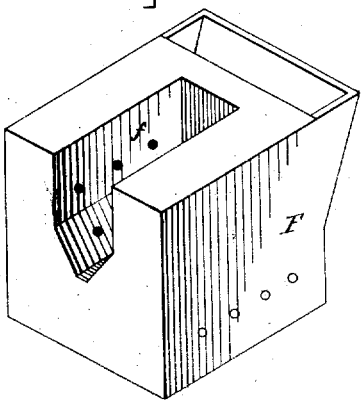
Figure 7:
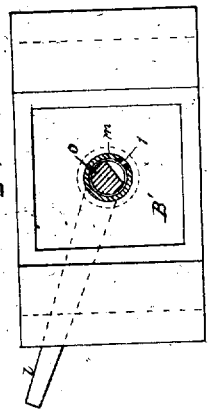
Figure 6:
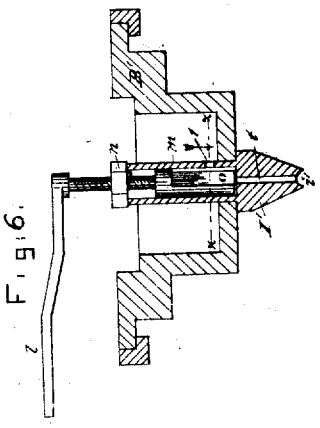

Figure 1 is a front elevation of the entire machine. Fig. 2 is a side elevation of section 1, which comprises the cylinder-forming mechanism. Fig. 3 is a side elevation of section 2, which comprises the mechanism for attaching the bottoms to the cylinders. Fig. 4 is a vertical section through Fig. 2, and Fig. 5 is a perspective view of the furnace and perforated guard. Fig. 6 is a vertical section taken through the solder-bath and soldering-iron for the can-body, and Fig. 7 a section of Fig. 6 on the line $x$ $x$.

The chief object of this invention is the production of a machine to form the cylindrical part of a can and automatically solder the longitudinal seam therein.

Prior to the date of our invention it was customary to shape the cylindrical parts of cans upon a mold by means of jaws, after which they were soldered by means of a soldering-tool moved by hand.

In this our invention the sheets of tin for the can-cylinders are bent into shape about a mold by means of jaws, after which, and while the jaws hold the cylinder thereon, the soldering-iron is automatically moved forward and along over the lapped edges of the tin, soldering the same, a furnace in connection with the apparatus keeping the soldering-iron hot.

The solder is shown as contained, in a molten state, in a solder-bath, from which it is intermittingly discharged at the proper time into the soldering-iron, and put from the latter upon the edges to be soldered together as the iron is automatically carried along over and in contact with the said edges.

The can-cylinders having been made, they are placed upon another part of the machine, where the head is soldered into the body.

D D D D represent the frames which constitute the body of the machine.

A is the main shaft, to which are attached the various cams $C^1$ $C^2$ $C^3$ $C^4$ $C^5$ $C^6$, which communicate motion to the various parts, viz: The cam $C^1$ acts upon the roller $r^1$ on the rocker-arm $R^1$ $R^1$, which moves freely on the spindle P, and communicates a forward and backward movement to the mold M, which slides freely but accurately through the slotted guideway G.

The cams $C^2$ and $C^3$ act upon the rollers $r^2$ and $r^3$ of the connecting-rods $R^2$ and $R^3$, and raise or lower the clips $K^2$ and $K^3$, as required, causing them to shape the sheet of tin into cylindrical form about the mold.

The cam $C^4$ acts upon the roller $r^4$ on the arm $R^4$, keyed to the spindle P, and turns it and its connected arms $B^1$, causing them to communicate a forward and backward movement to the soldering apparatus $B^1$ $F^1$ at the proper time. In a similar manner the soldering apparatus $B^2$ $F^2$ for the heads of the cans is operated by the cam $C^6$.

The cam $C^5$, by means of the roller $r^5$, connecting-rod $R^5$, and combined levers $b$ and $d$, communicates an upward and downward movement to the sliding bracket L, which carries the spindle $w$, to one end of which is attached the friction-roller $x$, and to the other a holder, $h$, and plate $k$, fitted together by means of a sliding key or feather, so that the holder $h$ and spindle $w$ can move up or down through, but cannot rotate without also revolving, the plate $k$, to which are attached the spring arms or clips $p$ and $p$, for the purpose of holding the cylinder and bottom in position during the soldering process.

Q is a beveled friction-sector, for the purpose of imparting, by means of the friction-pulley $x$, a rotary motion to the spindle $w$ and its fittings.

The soldering apparatus for each section is substantially alike, except as to the length of the soldering-iron—that is, in each there is a solder-bath to contain molten solder and a valve mechanism to, at proper times, permit a chamber to be filled with solder, and to be discharged thence into the soldering-iron upon the edges to be soldered—and we shall therefore describe the construction of the valve and bath and iron of but one section.

In the bath containing the molten solder is a tube, *m*, which has a solder-discharging passage, *t*, leading from the chamber within the said tube to the beak of the soldering-iron I′. The tube *m* has through its side an opening, 1, through which molten solder from the solder-bath will pass into the tube, unless the said opening is stopped by the valve *o*, made as a cylindrical plug, with a portion of its periphery cut away, as shown in the drawings.

The stem of the valve is screw-threaded to receive a nut, *n*, by which the valve may be raised or lowered to increase or diminish the capacity of the tube-chamber. The valve-stem has connected with it a lever, *l*, which, as the solder-bath is moved backward and forward, strikes a stud, *a*, and turns the valve, so that when the bath is backward in its normal position the molten solder in the solder-bath has free entrance into the chamber of the tube through the passage 1, but as soon as the lever strikes the stud *a* in the forward movement of the bath the valve is turned to close the passage 1 and uncover the other passage, *t*, communicating with the beak of the soldering-iron.

Attached to the frame-work D D D D are the guides S′ S′ S² S², for the purpose of guiding the soldering apparatus to its working position when required.

The furnaces F′ F² to heat the solder-bath and soldering-iron for each section are alike, so we need particularly describe but one of them.

Each furnace (see Figs. 4, 5) has a perforated guard, *f*, to prevent the adhesion of dust or cinders upon the soldering-iron while being heated. The furnaces are so placed below the baths as to keep the irons perfectly heated and to keep the solder contained in the baths and valves in a molten state.

The action of the body-forming section of the machine (shown at the right of Fig. 1 and in Figs. 2 and 4) is as follows: The metal plate to be formed into a can-body, having been cut to the required size, is placed in position upon the gages *g g*, and the mold M is thrown forward by the cam C′ and rod R′, during which operation the upper part of the connecting-rod R′ strikes the plate-clamping device *e*, causing it to gripe the plate of metal centrally and hold it firmly against the under side of the mold preparatory to the operation of the jaws or clips. The clips K² K³, by the action of the cams C² C³, are then raised, clasping or bending the metal plate closely about the mold, which has the shape of the interior of the can. The cam C² has a slight amount of lead over the cam C³, to close the clip K² just in advance of the clip K³, thus allowing one edge of the plate of metal to overlap the other edge, to thereby insure a perfect joint upon the application of the solder to the said edges.

When the plate of metal has been fitted to the mold, and while it is held thereon by the clips, the cam C⁴ moves the soldering apparatus as far forward as the inner edge or end of the metal body to be soldered, and the lever or arm *l* of the solder-controlling valve mechanism strikes the stud *a*, thereby opening communication between the solder-bath and the chamber in the tube, when the molten solder in the said chamber is free to flow out through the passage *t* and from the beak of the soldering-iron, thus enabling the molten solder in the said chamber to be deposited upon and along the overlapped edges of the plate of metal bent in can form as the soldering-iron in its forward movement passes over the said edges.

When the soldering apparatus has traversed and deposited solder along the entire seam it immediately makes a backward movement, still pressing its heated point against the seam to insure the perfect soldering of the edges, and returns to the furnace F′, where it is reheated. At a short interval after the soldering apparatus has completed the seam, the clips K² and K³ are lowered by the action of the cams C² C³, and the mold M and plate-clamping device *e* are withdrawn. The can-body is stopped against the outer face of the guide-way G by the withdrawal of the mold, and the act of withdrawal of such mold serves thereby to discharge the can-body from the machine.

The cylinder or body is then taken to the other or bottom-affixing section. (Shown at the left of Fig. 1 and in Fig. 3.) In this bottom-affixing section it will be supposed that the sliding bracket L is at the lower end of the slide W. In this position the metal cylinder, soldered as just described, is pressed within the upturned edges of a disk of metal already punched to form the bottom of the can, and the two pieces thus temporarily united are placed bottom downward in the holder *h* and held in position by the spring-clips *p p*. The soldering apparatus B² I² is then brought forward by the action of the cam C⁶, and the sliding bracket L is immediately afterward raised by the action of the cam C⁵, so that the point of the soldering-iron I² shall be in the position within the can, as shown by the dotted lines, section 2, Fig. 1, in effecting which the valve of the soldering apparatus is opened, similarly to the manner described in the action of section 1, and at the same time the beveled sector Q, by means of the friction-pulley *x*, imparts a rotary motion to the holder *h* and can-body, causing the charge of solder to be evenly distributed around the seam, which, being completed, the sector Q ceases to rotate the holder *h*, the sliding bracket is allowed by the cam C⁵ to descend, the soldering apparatus, by the action of cam C⁶, returns to the furnace F² to be reheated, and the point *z* of the spindle *w* strikes the main shaft A and presses the holder *h* inwardly against the springs *p p*, allowing the finished can to be withdrawn and replaced by another cylinder and bottom, when the entire operation last described is repeated.

The front edges of the clips $K^2$ $K^3$ are beveled (see Fig. 1) to form a channel for the solder, and the lower end of the soldering-bolt I′ is also correspondingly beveled to run in the said channel between the ends of the said jaws.

We claim—

1. The mold M and the plate-clamping device to hold the plate to the mold prior to the action of the clips upon the plate, combined with the clips to wrap or bend the plate about the mold and mechanism to operate the said clips and plate-clamping devices at the proper time, substantially as described.

2. The mold M, clips to wrap a plate of metal about it, and the guideway for the mold, combined with means to operate the mold and clips, whereby the can-body is shaped and discharged from the mold, substantially as described.

3. In a can forming and soldering machine, the mold M, clips to form or wrap the metal plate about the mold, and means to operate the clips, combined with a soldering-iron and means to automatically operate the same and cause it to solder together the edges of the can-body from end to end while the can-body is held, substantially as described.

4. The furnace combined with the reciprocatable solder-bath, the attached soldering-iron provided with the solder-passage leading to the beak of the iron, the valve to control the flow of solder from the solder-bath to the supply-chamber for the said iron and from the iron to the head of the can to be soldered, and means to operate the said valve at the proper times, according to the position of the solder-bath, substantially as set forth.

5. The solder-bath having within it a hollow soldering-iron, I′, and a valve to control the discharge of the solder therefrom upon the can-body to be soldered, combined with means to move the bath and iron forward and backward from end to end of the can-body the said soldering-iron connected with the said ducts depositing the molten solder upon the longitudinal seam of the can-body during its forward movement, and smoothing the solder along and completing the said seam as the bath and iron are moved backward.

6. The reciprocatable solder-bath and attached soldering-iron, combined with the stationary furnace, whereby the bath and iron are heated at each return of the furnace.

7. A hollow soldering-bolt having a beveled end, combined with the correspondingly-beveled clips, substantially as and for the purpose described.

8. The tube *m* in the solder-bath, the valve-stem, and arm or lever *l*, in combination with the stop *a*, to operate the valve as the solder-bath is reciprocated, substantially as described.

9. The combination of the rising and falling and intermittently-rotated holder *h*, set at an inclination, as described, the traveling bath $B^2$, and the hollow bevel-pointed soldering-tube $I^2$, substantially as shown and described.

10. The combination of the friction beveled sector Q, friction-pulley *x* on the spindle *w*, and the cam $C^5$, connecting-rod $R^5$, and levers *b* and *d*, whereby the table is elevated and depressed and a rotary motion given to it, substantially as and for the purpose set forth.

PETER DILLON.
JOHN CLEARY.

Witnesses:
H. A. ELKINS,
ANGUS McDONALD.